(12) United States Patent
Grobon

(10) Patent No.: US 7,005,841 B2
(45) Date of Patent: Feb. 28, 2006

(54) PROCESS FOR THE RELATIVE LOCATING OF TWO ELECTRICAL APPLIANCES

(75) Inventor: Xavier Grobon, Bourg la Reine (FR)

(73) Assignee: Thomson Licensing, Boulogne-Billancourt (FR)

( * ) Notice: Subject to any disclaimer, the term of this patent is extended or adjusted under 35 U.S.C. 154(b) by 2 days.

(21) Appl. No.: 10/660,140

(22) Filed: Sep. 11, 2003

(65) Prior Publication Data
US 2004/0124851 A1 Jul. 1, 2004

(30) Foreign Application Priority Data
Sep. 13, 2002 (FR) .................................. 02 11534

(51) Int. Cl.
G01R 27/02 (2006.01)
G01R 19/00 (2006.01)
(52) U.S. Cl. ......................................... 324/66; 324/606
(58) Field of Classification Search ................ 324/606, 324/602, 605, 508, 510, 511, 66, 67; 380/239–242; 725/131, 136, 151, 70–72; 340/531, 657, 340/658; 455/73, 556.1
See application file for complete search history.

(56) References Cited

U.S. PATENT DOCUMENTS 3,882,392 A * 5/1975 Harney ......................... 725/79
4,553,161 A * 11/1985 Citta ........................... 725/131
5,521,491 A * 5/1996 Najam ........................... 324/86
6,002,331 A * 12/1999 Laor ......................... 340/539.1
2003/0108206 A1 * 6/2003 Diehl et al. .................. 380/277

FOREIGN PATENT DOCUMENTS

| WO | WO02/052850 A1 | 3/1998 |
| WO | WO98/18211 | 4/1998 |
| WO | WO98/57462 | 12/1998 |
| WO | WO01/54297 A1 | 7/2001 |

OTHER PUBLICATIONS

French Search Report of May 26, 2003.

* cited by examiner

Primary Examiner—Anjan Deb
Assistant Examiner—Jeff Natalini
(74) Attorney, Agent, or Firm—Joseph S. Tripoli; Robert D. Shedd; Paul P. Kiel

(57) ABSTRACT

A process allows the relative locating of a first electrical appliance and a second electrical appliance by the measurement of a first number of alternations or of electrical periods by the first electrical appliance from the energizing of the said first part and up to transmission of a signal by the first electrical appliance, the measurement of a second number of alternations or of electrical periods by the second electrical appliance from the energizing of the said second part and up to receipt of a signal from the first electrical appliance and the comparison of the first number with the second number.

10 Claims, 4 Drawing Sheets

PROCESS FOR THE RELATIVE LOCATING OF TWO ELECTRICAL APPLIANCES

FIELD OF THE INVENTION

The present invention relates to a process for the relative locating of two electrical appliances.

BACKGROUND OF THE INVENTION

It is sometimes desirable to ensure that two electrical appliances are plugged into the same domestic electrical network, in particular when one wishes to ensure that they are located in the same residence.

For example, when a service provider—for example a provider of video content—offers a second subscription at reduced price on condition that the same residence already benefits from a first subscription, one wishes to be able to verify that the two electrical appliances (each benefiting from one of the subscriptions) are actually at the same residence, that is to say on the same domestic electrical network.

It has long been known how to benefit from the fact that electrical appliances share the same electrical network in order to facilitate their interaction, as described, for example, in U.S. Pat. No. 3,882,392.

It is known, in particular, to make the electrical appliances of one and the same domestic electrical network hold a dialogue with one another by virtue of the technology of carrier currents, as is described in Patent Application WO 98/18211.

The possibility of making two appliances communicate by carrier currents does not however make it possible to ensure that the two appliances are in the same residence. Specifically, when the two domestic networks are not separated by a transformer, communication from one network to the other is possible if no particular provision for isolation is made (reference may be made in this regard to Patent Application WO 2001/54297).

SUMMARY OF THE INVENTION

The invention therefore notably allows to ensure that two electrical appliances share the same residence (and hence the same domestic electrical network), regardless of the configuration of the neighbouring networks, provided that the domestic electrical network is plugged into a circuit breaker (which ought always to be the case).

The invention proposes a process for the relative locating of a first electrical appliance plugged into a first part of an electrical network and a second electrical appliance plugged into a second part of the electrical network comprising the following steps:

measurement of a first number of alternations or of electrical periods on the first part by the first electrical appliance from the energizing of the first part and up to transmission of a signal by the first electrical appliance;

measurement of a second number of alternations or of electrical periods on the second part by the second electrical appliance from the energizing of the second part and up to receipt of a signal from the first electrical appliance;

comparison of the first number with the second number.

Advantageously, exchange of the first number or of the second number is performed by a communication between the first electrical appliance and the second electrical appliance. The communication is, for example, a communication by carrier currents.

In this case, the signal may correspond to the start signal for the communication.

When it is applied, this process generally comprises a step posterior to the comparison whose nature depends on the difference between the first number and the second number.

In a preferred manner, the transmission of the signal takes place after a specified duration determined by the first electrical appliance;

the specified duration lies between 1 s and 20 s;

the specified duration has at least one random or pseudo-random component.

Viewed from a first electrical appliance, the invention proposes a process for locating this first electrical appliance plugged into a first part of an electrical network relative to a second electrical appliance plugged into a second part of the electrical network comprising the following steps:

measurement of a first number of alternations or of electrical periods on the first part by the first electrical appliance from the energizing of the first part and up to the start of a communication with the second electrical appliance;

receipt by the first electrical appliance of a second number of alternations or of electrical periods on the second part measured by the second electrical appliance from the energizing of the second part to the start of communication;

comparison of the first number with the second number.

Stated otherwise, the invention proposes a process for the relative locating of a first electrical appliance plugged into a first part of an electrical network and a second electrical appliance plugged into a second part of the electrical network comprising the following steps:

measurement according to a specified criterion of a first characteristic related to the electrical signal on the first part by the first electrical appliance;

measurement according to the same criterion of a second characteristic related to the electrical signal on the second part by the second electrical appliance;

comparison of the first characteristic with the second characteristic.

In a particularly advantageous application, the invention proposes a process for decrypting a digital content by a first electrical appliance plugged into a first part of an electrical network, a second electrical appliance being plugged into a second part of the electrical network, comprising the following steps:

measurement according to a specified criterion of a first characteristic related to the electrical signal on the first part;

measurement according to the said criterion of a second characteristic related to the electrical signal on the second part;

comparison of the first characteristic with the second characteristic;

decryption if and only if the result of the comparison is positive.

Provision may be made for the result of the comparison to be positive if and only if the first characteristic is equal to the second characteristic or that the result of the comparison is positive if and only if the first characteristic differs from the second characteristic by less than a predetermined tolerance value.

The process can also comprise a step of exchange of the first characteristic or of the second characteristic by a communication by carrier currents.

For this application, the first electrical appliance and the second electrical appliance are, for example, digital decoders.

BRIEF DESCRIPTION OF THE DRAWINGS

Other characteristics of the invention will become apparent in the light of the description of an exemplary embodiment of the invention given with reference to the appended figures, where.

DETAILED DESCRIPTION OF PREFERED EMBODIMENTS

Figure 1:
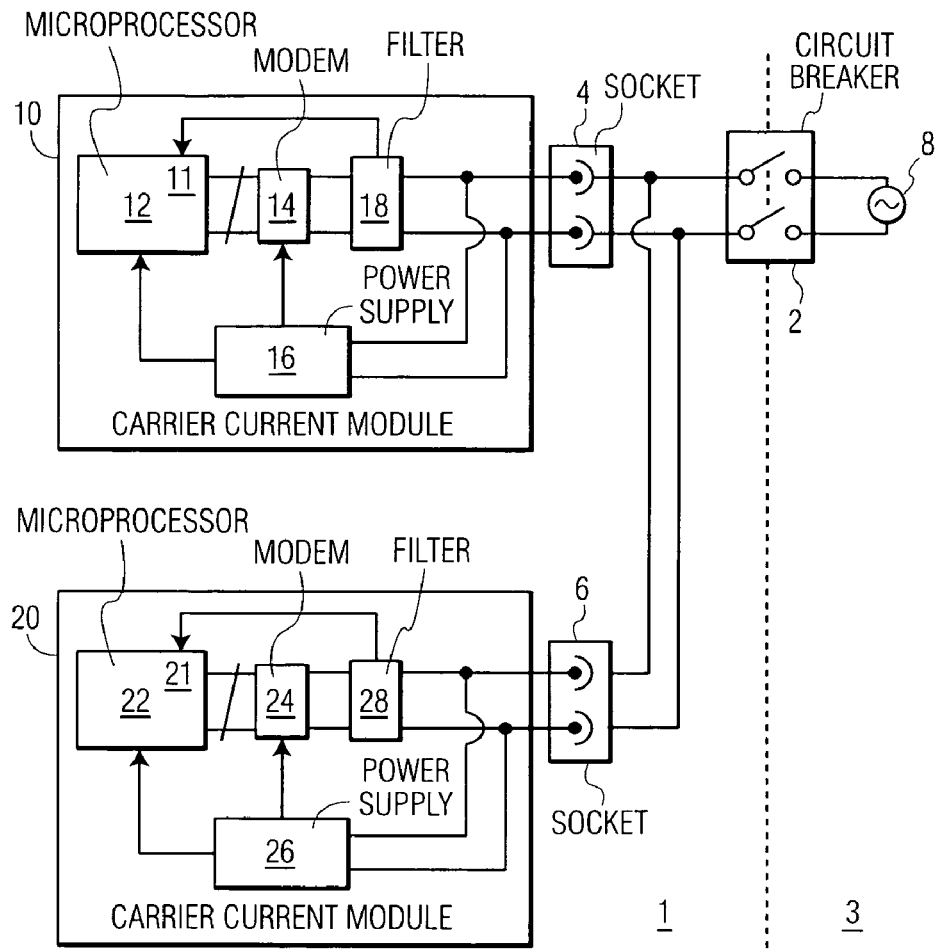
FIG. 1 represents a first embodiment of the invention.

In a first exemplary embodiment of the invention, represented in FIG. 1, the electrical appliances are a first carrier currents module 10 and a second carrier currents module 20. One wishes to verify that these two modules 10, 20 are located on the same domestic electrical network 1, for example before permitting them to exchange secure information with one another.

Each module 10, 20 is plugged into the domestic electrical network 1 by means of a respective socket 4, 6. Each module 10, 20 comprises a microprocessor 12, 22, a modem 14, 24, a power supply 16, 26 and a filter 18, 28.

The power supplies 16, 26 are in fact converters that deliver DC voltages to the microprocessor 12, 22 and the modem 14, 24 from the AC "mains" voltage present on the domestic electrical network 1.

In each module, the microprocessor 12, 22 is linked to the modem 14, 24 by a bus; the modem 14, 24 is for its part linked across the filter 18, 28 to the domestic electrical network 1 which is used by the modem 14, 24 as information transmission line.

The filter 18, 28 also possesses an electrical output intended for a measurement pin 11, 21 of the microprocessor 12, 22 and representative of the electrical voltage present at the input of the filter 18, 28, that is to say the electrical voltage present at each instant on the domestic electrical network 1 at the level of the socket 4, 6 where the module 10, 20 is plugged in.

The domestic electrical network 1 is connected to the public network 3 by way of a circuit breaker 2 and therefore carries in particular an AC power voltage provided by the generator 8 of the public network 3. It is, for example, an AC voltage of nominal value 220 V with a frequency of 50 Hz.

Figure 2:
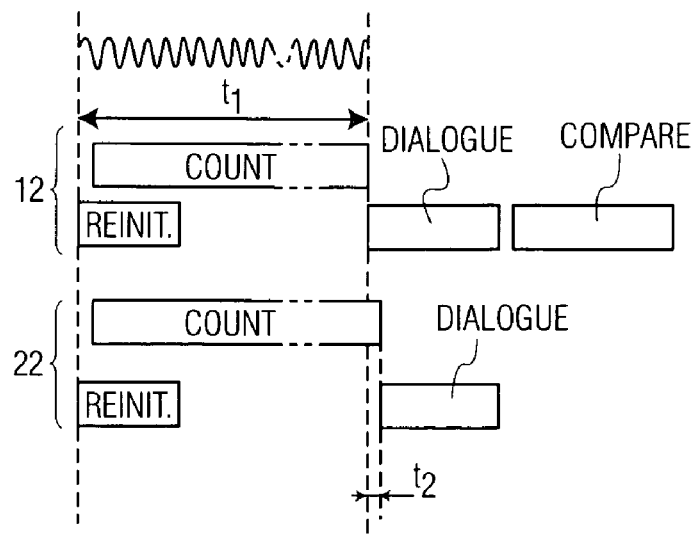
FIG. 2 diagrammatically represents the operation of the modules at FIG. 1.
Figure 3:
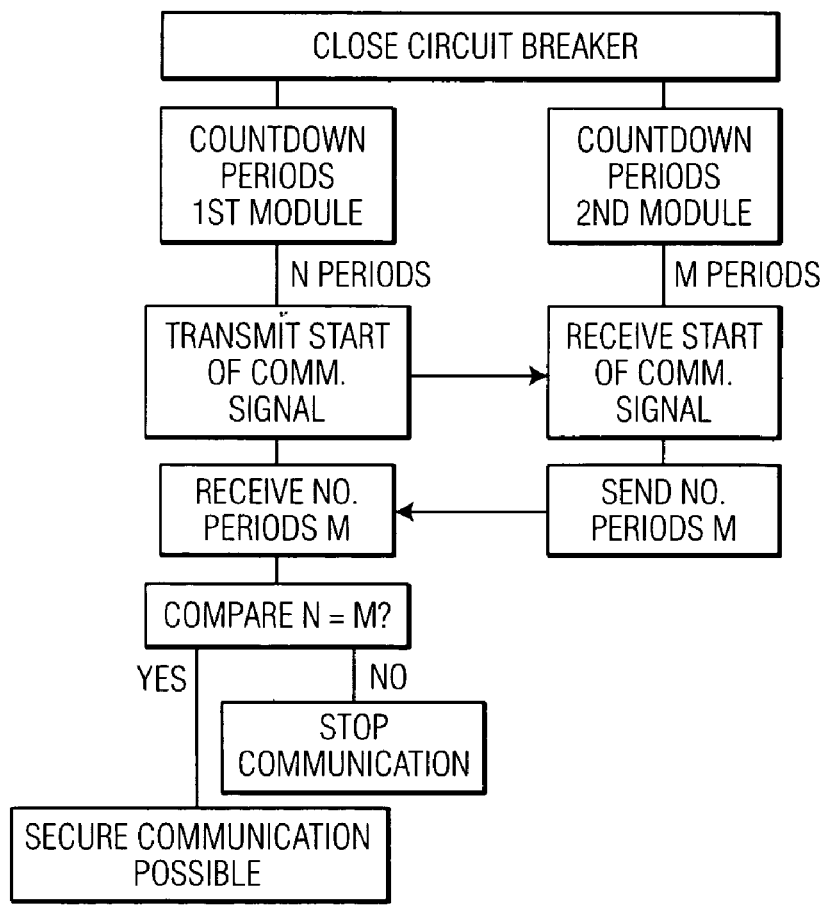
FIG. 3 is a flow chart of the operation of the modules of FIG. 1.

The process for verifying the location of the electrical appliances, here carrier current modules, begins with the re-energizing of the domestic electrical network 1, in general deliberate energizing (closure of the circuit breaker 2) after a deliberate tripout by means of the circuit breaker 2. Through this new deliberate energizing, the user thus launches the verification procedure represented diagrammatically in FIGS. 2 and 3 and described in detail hereinbelow.

For each microprocessor 12, 22, the return of the mains voltage (voltage of the domestic electrical network 1) and hence of the DC voltage provided by the respective power supply 16, 26, launches a reinitialization procedure. This reinitialization procedure implements (very quickly, that is to say in a few µs) an interrupt subprogram which counts down the number of periods of the electrical signal at the level of the socket 4, 6 where the module 10, 20 is plugged in, by virtue of the signal received by the pin 11, 21. The interrupt subprogram increments a counter with each period of the mains voltage.

In the first module 10, the counting down of the electrical periods takes place for a specified duration t1. This specified duration t1 may be a pre-specified duration, a pseudo-random duration or the sum of a pre-specified duration and of a pseudo-random duration. In general, this duration t1 will be chosen of the order of a few seconds (that is to say large relative to that of a period, here 20 ms).

At the end of the duration t1, the value N of the counter of the periods for the first module 10 is stored and the microprocessor 12 seeks to enter into communication with other modules by virtue of the modem 14 by the transmission over the domestic electrical network 1 of a start of communication signal.

In the second module 20, the counting down of the electrical periods takes place up to receipt by the microprocessor 22 of the start of communication signal. Specifically, as soon as the microprocessor 22 receives the start of communication signal by way of the modem 24, it stores the value M of the counter of the periods, then it responds to the start of communication signal from the microprocessor 12 of the first module 10 so as to establish a communication (or dialogue) between the first module 10 and the second module 20.

The set-up time for establishing the communication t2 is typically of the order of 2 to 3 ms and may therefore be neglected relative to the duration of a period (around 20 ms); a signal other than the start of communication could moreover be used, the important thing being to trigger the stoppage of counting on the second module.

Once the communication has been established, the second module 20 sends the number M of periods that it has measured to the first module 10.

The first module 10 then compares the number of periods M measured by the second module 20 with the number of periods N measured by itself.

If the two modules 10, 20, are actually on the same domestic electrical network (as is represented in FIG. 1), the number of periods measured between the re-energizing and the end of the countdown (almost common for the two modules) will be identical for the two modules 10, 20.

On the other hand, if the two modules 10, 20 are plugged into two different domestic networks, then in order to obtain a common result in the two modules, it would be necessary for the respective circuit breakers to be reset at instants separated by less than 20 ms, this being impossible in practice.

If the number of periods N measured by the first module 10 is equal to the number of periods M measured by the second module 20 (condition N=M), the two modules 10, 20 are therefore regarded as plugged into the same domestic electrical network and thus, for example, as being able to exchange secure data.

On the other hand, if the measurements of the number of periods give different results (N different from M), then the two modules 10, 20 are regarded as being located on different domestic networks; it is then, for example, possible to prohibit any posterior communication between the two modules.

Figure 4:
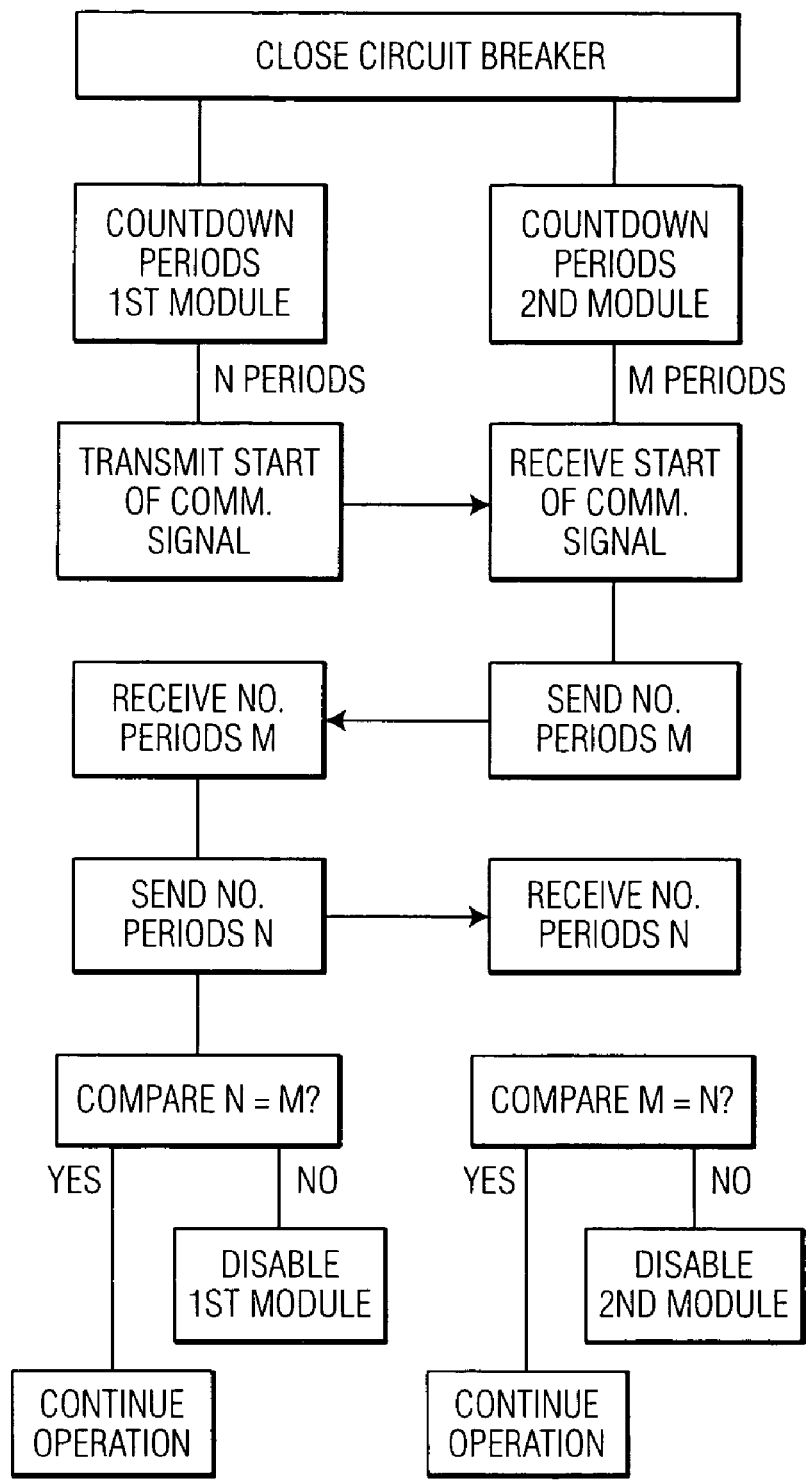
FIG. 4 represents a variant embodiment of FIG. 3.

According to a first variant embodiment of the invention represented in FIG. 4, when the second module 20 has communicated its countdown M to the first module 10, the first module 10 communicates its countdown N to the second module 20. (Of course, the exchange of countdowns may, in a similar manner, take place in the reverse order.)

According to this first variant, each module 10, 20 compares the two countdowns N and M on its side and interrupts its operation if N is different from M. Of course, if N is equal to M, one has verified that the two modules 10, 20 are on the same domestic electrical network and their operation can therefore continue normally.

According to a second variant embodiment (which may be combined with the first variant), the condition N=M is replaced with a more flexible condition, for example:

$$M-N=0 \text{ or } M-N=1;$$

$$|M-N|<i, \text{ with, for example, } i=2.$$

According to this second variant embodiment, the two modules 10, 20 are regarded as being on the same domestic electrical network if their respective countdowns of periods differ little (are equal to within a period in the examples given). This makes it possible to take account of the possible differences in duration of energization from one module to the other, as well as of the set-up time t2 for establishing the communication.

However, the tolerated difference between the two countdowns must remain small (preferably 1 period, that is to say i=2 in the example above) so as to always distinguish the cases where two circuit breakers each having a module on its network are closed at very similar instants.

Hitherto, the embodiments described implement a link of essentially the master/slave type between the two modules 10, 20; specifically, the first module 10 determines the instant of stoppage of the countdown (after the time t1) and then orders the stoppage of the countdown in the second module 20 (by a start of communication signal).

According to a third variant embodiment of the invention (which may also be combined with the previous variants), the role of the two modules 10, 20 in the stoppage of the countdown is symmetric. According to this variant, there is provision for each module 10, 20 to determine a countdown duration t1, t1' preferably having a pseudo-random component and to measure the number of mains periods over this duration t1, t1' unless interrupted by a start of communication signal generated by the other module 20, 10.

The counting down of the periods will therefore take place over the shorter of the two durations t1, t1' and the module which generated in pseudo-random manner the shorter duration will be the one which will initiate the communication phase.

Figure 5:
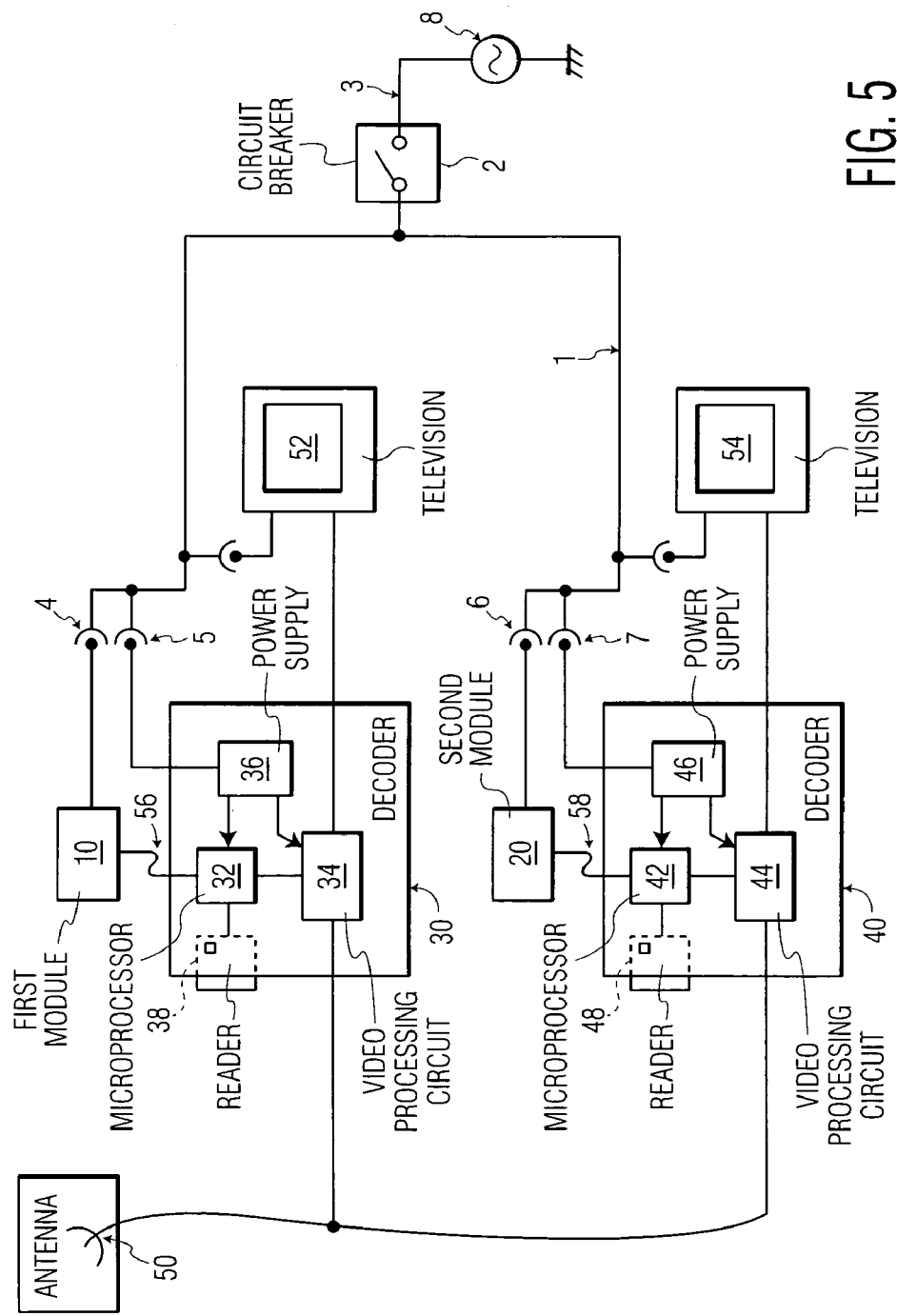
FIG. 5 represents a second embodiment of the invention.

FIG. 5 describes an application of the invention to the verification of the siting of two digital decoders, for example when the second digital decoder benefits from a subscription at reduced price on condition that it is located in the same residence as the first digital decoder, that is to say in practice that it is plugged into the same domestic electrical network.

A first digital decoder 30 is plugged into a socket 5 of the domestic electrical network 1. In proximity, a first carrier currents module 10 of the type described in FIG. 1 is plugged into a socket 4. The first digital decoder 30 is moreover linked to the first module 10 by way of a standard serial link 56, for example of the RS232 type.

In a similar manner, a second digital decoder 40 is plugged into a socket 7 of the domestic electrical network 1. In proximity, a second carrier currents module 20 is plugged into a socket 6. The second digital decoder 40 is linked to the second module 20 by a serial link 58.

Each digital decoder 30, 40 comprises a video processing circuit 34, 44 which receives a modulated and encrypted signal from an antenna 50 and generates a video signal destined for a respective television 52, 54. Each digital decoder 30, 40 also possesses a microprocessor 32, 42 which receives the serial link originating from the respective module 10, 20. The microprocessor 32, 42 of each digital decoder 30, 40 is also linked to the video processing circuit 34, 44 and to a chip card reader 38, 48.

The first digital decoder 30 reads (secret) information from the chip card inserted into the reader 38, this information allowing the decryption of the signal received from the antenna 50 into a video signal by the video processing circuit 34.

The second digital decoder 40 benefits from a reduced subscription: the card inserted into the reader 48 will not allow the decryption of the signal received from the antenna 50 unless it is verified that the second digital decoder 40 is located on the same domestic electrical network as the first digital decoder 30.

This verification is performed by the modules 10 and 20 as described in the first embodiment of the invention. When the verification is positive, the modules 10 and 20 (and therefore the digital decoders which are linked to each of them) can exchange information which allows decryption in the second digital decoder 40.

An exemplary implementation is as follows: provision may be made for the second digital decoder 40 (reduced subscription) to need a part (at least) of the secret of the card located in the first digital decoder 30 (main subscription) to decrypt the content that it receives.

The principal steps necessary before any decryption by the second digital decoder 40 are in this case the following:

closure of the circuit breaker 2 (by the user who wishes to profit from the second subscription at reduced price in his residence);

simultaneous counting down of the periods of the mains voltage in the first module 10 and in the second module 20;

stoppage of the countdown in the first module 10 and transmission of a signal to the second module 20;

receipt of the signal by the second module 20 and immediate stoppage of the countdown in the second module 20;

sending of the countdown from the second module 20 to the first module 10;

comparison of the countdown of the second module 20 with the countdown of the first module 10;

in case of inequality, end of the communication;

in case of equality, request to the first decoder 30 by the first module 10 for the part of the secret, receipt of the part of the secret by the first module 10, sending of the part of the secret from the first module 10 to the second module 20, sending of the part of the secret from the second module 20 to the second decoder 40.

The part of the secret may be stored in the second module 20 or in the second decoder 40 in a volatile memory so as to disappear as soon as the appliance which stores it is unplugged from the mains (i.e. from the domestic electrical network 1).

All the indicated variants relative to the first embodiment are of course applicable to the embodiment just described.

Additionally, provision may be made for the first module 10 to form an integral part of the first digital decoder 30. Likewise, the second module 20 can form part of the second digital decoder 40. The power supplies 36, 46 and the microprocessors 32, 42 of the digital decoders 30, 40 then advantageously fulfil the functions of the power supplies 16, 26 and of the microprocessors 12, 22 of the modules 10, 12. Connection to a single mains socket 5, 7 is then sufficient for each decoder/module assembly and the serial link which linked the microprocessors (12 and 32 on the one hand, 22 and 42 on the other hand) disappears.

The above examples have proposed countdowns and a comparison of the number of periods of the electrical signal; by way of variant, it is of course possible to measure and compare the number of alternations (i.e. of half-periods) of the electrical signal.

Although the technique of communications by carrier currents is particularly suited to the context of the invention so as to effect communication between the two electrical appliances (in particular the sending of the number of periods or of alternations), it is also possible to implement the invention using other means of communication between the two electrical appliances, for example a local area network (of the computing network type).

What is claimed is:

1. A process for the relative locating of a first electrical appliance plugged into a first part of an electrical network and a second electrical appliance plugged into a second part of the electrical network comprising the following steps:

measurement of a first number of alternations or of electrical periods on the first part by the first electrical appliance from the energizing of the first part and up to transmission of a signal by the first electrical appliance;

measurement of a second number of alternations or of electrical periods on the second part by the second electrical appliance from the energizing of the second part and up to receipt of the signal from the first electrical appliance;

comparison of the first number with the second number.

2. A process according to claim 1, with a step of:

exchange of the first number or of the second number by a communication between the first electrical appliance and the second electrical appliance.

3. A process according to claim 2, wherein the communication is a communication by carrier currents.

4. A process according to claim 2, wherein said signal corresponds to a start signal for the communication.

5. A process according to claim 1, with a step posterior to the said comparison whose nature depends on the difference between the first number and the second number.

6. A process according to claim 1, wherein a transmission of said signal takes place after a specified duration determined by the first electrical appliance.

7. A process according to claim 6, wherein the specified duration lies between 1 s and 20 s.

8. A process according to claim 6, wherein the specified duration has at least one random or pseudo-random component.

9. A process for locating a first electrical appliance plugged into a first part of an electrical network relative to a second electrical appliance plugged into a second part of the electrical network comprising the following steps:

measurement of a first number of alternations or of electrical periods on the first part by the first electrical appliance from the energizing of the first part and up to the start of a communication with the second electrical appliance;

receipt by the first electrical appliance of a second number of alternations or of electrical periods on the second part measured by the second electrical appliance from the energizing of the second part to the start of communication;

comparison of the first number with the second number.

10. A process for the relative locating of a first electrical appliance plugged into a first part of an electrical network and a second electrical appliance plugged into a second part of the electrical network comprising the following steps:

measurement according to a specified criterion of a first characteristic related to the electrical signal on the first part by the first electrical appliance from the energizing of the first part and up to the start of a communication with the second electrical appliance;

measurement according to said criterion of a second characteristic related to the electrical signal on the second part by the second electrical appliance from the energizing of the second part and up to receipt of a signal from the first electrical appliance;

comparison of the first characteristic with the second characteristic.

* * * * *